United States Patent
Wang et al.

(10) Patent No.: US 12,340,499 B1
(45) Date of Patent: Jun. 24, 2025

(54) METHOD AND SYSTEM FOR STATISTICS OF THICKNESS OF CORROSION PRODUCT FILM BASED ON IMAGE PROCESSING

(71) Applicant: CHINA UNIVERSITY OF PETROLEUM (EAST CHINA), Shandong (CN)

(72) Inventors: Cailin Wang, Qingdao (CN); Yuxing Li, Qingdao (CN); Cuiwei Liu, Qingdao (CN); Qu'er Chen, Qingdao (CN); Xiusai Xu, Qingdao (CN); Rui Zhang, Qingdao (CN); Jun Zhang, Qingdao (CN); Zaiyu Xia, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 18/949,614

(22) Filed: Nov. 15, 2024

(30) Foreign Application Priority Data

Dec. 22, 2023 (CN) .......................... 202311773693.3

(51) Int. Cl.
*G06T 7/00* (2017.01)
*G06T 7/11* (2017.01)
(Continued)

(52) U.S. Cl.
CPC ............... *G06T 7/0004* (2013.01); *G06T 7/11* (2017.01); *G06T 7/136* (2017.01); *G06T 7/194* (2017.01);
(Continued)

(58) Field of Classification Search
CPC ......... G06T 7/0004; G06T 7/11; G06T 7/136; G06T 7/194; G06T 2207/10061; G06T 2207/20021; G06T 2207/20221
See application file for complete search history.

(56) References Cited

U.S. PATENT DOCUMENTS 12,211,965 B2 * 1/2025 Kim ..................... H10H 20/855
2006/0288756 A1 12/2006 De Meurechy

FOREIGN PATENT DOCUMENTS

CN 111028229 A 4/2020
CN 111192198 A 5/2020
(Continued)

OTHER PUBLICATIONS

Jan. 31, 2024 Office Action issued in Chinese Patent Application No. 202311773693.3.
(Continued)

*Primary Examiner* — Bobbak Safaipour
(74) *Attorney, Agent, or Firm* — Oliff PLC

(57) ABSTRACT

The present invention provides a method and system for statistics of thickness of corrosion product film based on image processing, comprising obtaining overall image by stitching plurality of cross-sectional images of the corrosion product film on surface of pipeline; obtaining feature area of the corrosion product film by segmenting the overall image; performing division of the thickness layers on the feature area of the corrosion product film according to number of pixel points in vertical direction of thickness; counting the number of pixel points of each of the thickness layers; obtaining the thickness of each of the thickness layers according to counted number of pixel points; and, performing statistics of thickness after obtaining the overall image representing larger area of the corrosion product film on the surface of pipeline by stitching the plurality of images.

8 Claims, 3 Drawing Sheets

(51) Int. Cl.
*G06T 7/136* (2017.01)
*G06T 7/194* (2017.01)

(52) U.S. Cl.
CPC .............. *G06T 2207/10061* (2013.01); *G06T 2207/20021* (2013.01); *G06T 2207/20221* (2013.01)

(56) References Cited

FOREIGN PATENT DOCUMENTS

| CN | 113706531 A | 11/2021 |
|---|---|---|
| CN | 114387332 A | 4/2022 |
| CN | 115060754 A | 9/2022 |
| CN | 116309580 A | 6/2023 |
| CN | 116630323 A | 8/2023 |
| CN | 116977316 A | 10/2023 |
| CN | 116993745 A | 11/2023 |

OTHER PUBLICATIONS

Qu, Yanping et al. "Rating System of the Nickel Coating Corrosion Protection Grade Based on Image Processing." Surface Technology. vol. 37, No. 1, pp. 80-82, 2008.

Lu, Shaohui. "Research on Defects Detection Technology of Pipe Internal Surface Based on Active Stereo Omnidirectional Vision." China Academic Journal Electronic Publishing House. No. 4, pp. B022-5, 2018.

Li, Zhonghu et al. "Research on image acquisition and preprocessing method for visual measurement of pipeline inner surface corrosion." 2017 13th IEEE 13th International Conference on Electronic Measurement & Instruments. pp. 364-368. 2018.

Naladala, Indukala et al. "Corrosion Damage Identification and Lifetime Estimation of Ship Parts using Image Processing." 2018 International Conference Advances in Computing, Communications and Informatics. pp. 678-683, 2018.

Feb. 7, 2024 Notice of Allowance issued in Chinese Patent Application No. 202311773693.3.

\* cited by examiner

METHOD AND SYSTEM FOR STATISTICS OF THICKNESS OF CORROSION PRODUCT FILM BASED ON IMAGE PROCESSING

TECHNICAL FIELD

The present invention belongs to the technical field of image processing, and particularly relates to a method and system for statistics of thickness of a corrosion product film based on image processing.

BACKGROUND

Carbon steel is widely used in oil and gas pipelines in the oil and gas industry. The inner surface of the pipelines is easily corroded by carbon dioxide, hydrogen sulfide and other gases, and the outer surface of the pipelines is corroded by microorganisms and formation water, and the corrosion product films are formed on those surfaces of the pipelines. The characteristics, such as structure and morphology of the corrosion product film, reflect the corrosion mechanism of materials and greatly affect the corrosion process. Therefore, it is necessary to study the structure and morphology of the corrosion product film, and the thickness of the corrosion product film is one of the key parameters to evaluate the structure of the corrosion product film.

At present, the method of calculating the thickness of the corrosion product film is based on the observation of a single cross-sectional image captured by scanning electron microscope (SEM), and subjectively selecting the observation area to estimate the thickness of the corrosion product film, of which the accuracy is low; moreover, because of the uneven distribution of the corrosion product film on the surfaces of the pipelines, the thickness of the film also presents obvious uneven characteristics. The method for statistics of the thickness of the corrosion product film based on the single cross-sectional image captured by SEM, only can obtain the thickness of a small range of the corrosion product film, which is not representative and cannot reflect the distribution characteristics of the thickness of the corrosion product film.

SUMMARY

In order to solve the above problems, the present invention provides a method and system for statistics of thickness of a corrosion product film based on image processing, which can perform accurately visualize and quantitatively statistics of the thickness of the corrosion product film in a wide range with high resolution, and can obtain the distribution characteristics of the thickness of the corrosion product film in the wide range.

To achieve the above object, the present invention is realized through the following technical solutions.

In a first aspect, the present invention provides a method for statistics of thickness of a corrosion product film based on image processing, comprising:
acquiring a plurality of images of a corrosion product film on a surface of a pipeline;
stitching the plurality of the images to obtain an overall image; specifically, dividing each of the plurality of the images into a plurality of grid cells, estimating a homography matrix for each of the plurality of the grid cells; removing error matching points, searching for an optimal homography matrix and calculating a global homography matrix; calculating weight matrices in moving linear transformation in blocks according to the calculated global homography matrix and mapping to obtain the stitched overall image;
segmenting the overall image to obtain a feature area of the corrosion product film; specifically, segmenting a gray histogram into two sets of target and background data through thresholds, and when a between-class variance of the two sets of the segmented data is the largest, obtaining an optimal segmentation threshold, and then segmenting the overall image according to the optimal segmentation threshold; and
performing division of thickness layers on the feature area of the corrosion product film according to a number of pixel points in a vertical direction of thickness, counting the number of the pixel points of each of the thickness layers, and obtaining a thickness of each of the thickness layers according to the counted number of the pixel points.

Further, obtaining a plurality of cross-sectional images of the corrosion product film on the surface of the pipeline by continuously shooting through a SEM; determining a magnification according to a principle of clearly distinguishing boundary lines between an inner surface and an outer surface of the corrosion product film during the shooting; and, performing the continuous shooting of pipeline cross-sections along a surface direction of a substrate of the pipeline under the determined magnification.

Further, in the plurality of the images, all two consecutive images have an overlapping area.

Further, performing a noise reduction processing on the plurality of the images; specifically, calculating and normalizing a Gaussian kernel according to a similarity window; calculating Euclidean distances between neighboring image blocks according to the normalized Gaussian kernel, and traversing all the pixel points to obtain a final weighted Euclidean distance of a center pixel point of a current image block; calculating a weight function according to the final weighted Euclidean distance; updating a value of the center pixel point of the current image block; initializing a weighted value to zero, updating a superposition weighted value until the plurality of the images are traversed, to finally obtain the weighted value at the center pixel point of the current image block; and, obtaining the overall image by performing reconstruction according to weighted values at center pixel points.

Further, extracting feature points of the plurality of the images, and performing a feature matching by similarity measurement; and stitching the plurality of the images to obtain a panoramic image of a cross-sectional morphology of the corrosion product film.

Further, segmenting the corrosion product film and the background according to different gray values in the stitched overall image.

Furthermore, dividing the corrosion product film into a plurality of the thickness layers according to the number of the pixel points in the vertical direction of thickness; scanning all of the plurality of the thickness layers layer by layer and counting the number of the pixel points between two interfaces of each of the plurality of the thickness layers; and, converting sizes of the pixel points into thicknesses, to complete the statistics of the thickness of the corrosion product film.

In a second aspect, the present invention also provides a system for statistics of thickness of a corrosion product film based on image processing, comprising:
a data acquisition module, being configured to acquire a plurality of images of a corrosion product film on a surface of a pipeline;

an image stitching module, being configured to stitch the plurality of the images to obtain an overall image; specifically, dividing each of the plurality of the images into a plurality of grid cells, estimating a homography matrix for each of the plurality of the grid cells; removing error matching points, searching for an optimal homography matrix and calculating a global homography matrix; calculating weight matrices in moving linear transformation in blocks according to the calculated global homography matrix and mapping to obtain the stitched overall image;

a feature segmentation module, being configured to segment the overall image to obtain a feature area of the corrosion product film; specifically, segmenting a gray histogram into two sets of target and background data through thresholds, and when a between-class variance of the two sets of the segmented data is the largest, obtaining an optimal segmentation threshold, and then segmenting the overall image according to the optimal segmentation threshold; and a thickness statistics module, being configured to perform division of thickness layers on the feature area of the corrosion product film according to a number of pixel points in a vertical direction of thickness, count the number of the pixel points of each of the thickness layers, and obtain a thickness of each of the thickness layers according to the counted number of the pixel points.

In a third aspect, the present invention further provides a non-transitory computer readable storage medium having a computer program stored thereon, when the computer program is executed by a processor, implementing the steps of the method for statistics of the thickness of the corrosion product film based on image processing according to the first aspect.

In a fourth aspect, the present invention further provides an electronic apparatus, comprising a memory, a processor, and a computer program stored on the memory and executable on the processor, when the program is executed by the processor, implementing the steps of the method for statistics of the thickness of the corrosion product film based on image processing according to the first aspect.

Compared with the prior art, the present invention has the beneficial effects that:

1. According to the present invention, the overall image which can represent a larger area of the corrosion product film on the surface of the pipeline can be obtained by stitching the plurality of cross-sectional images of the corrosion product film on the surface of the pipeline, and on this basis, the feature area of the corrosion product film can be obtained by segmenting the overall image; then, the division of the thickness layers can be performed on the feature area of the corrosion product film according to the number of the pixel points in the vertical direction of thickness, and the number of pixel points of each of the thickness layers can be counted; and, the thickness of the each of the thickness layers can be obtained according to the counted number of the pixel points. The statistics of the thickness is performed after obtaining the overall image which can represent the larger area of the corrosion product film on the surface of the pipeline by stitching the plurality of the images, can realize the visualization and quantitative statistics of the thickness of the corrosion product film in a large range with high resolution, can obtain the distribution features of the thickness of the corrosion product film in a large range, and can obtain the thickness of each of the thickness layers by calculating the number of the pixel points, which further ensures the accuracy of the statistics of the thickness.

2. According to the present invention, the noise reduction pretreatment is performed on the image to improve the image quality, so that the boundaries between the inner and outer layers of the corrosion product film can be clearly distinguished; image registration and image stitching are performed on the captured images to obtain a panoramic image of the cross-sectional morphology of the corrosion product film, which can comprehensively reflect the thickness distribution of the corrosion product film as much as possible, and the observation range of the images of the corrosion product film is enlarged under the premise of high resolution, which is more representative than thickness estimation by using a single image.

3. According to the present invention, the recognition and extraction of corrosion product films are realized by performing image segmentation on the panoramic images obtained by stitching; the thickness layers of the corrosion product film are divided according to the pixel points, and then the number of the pixel points is counted layer by layer and converted into the thickness, so that automatic quantitative statistics of the thickness of the corrosion product film can be realized, and the accuracy of the statistical of the thickness is ensured.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

Figure 1:
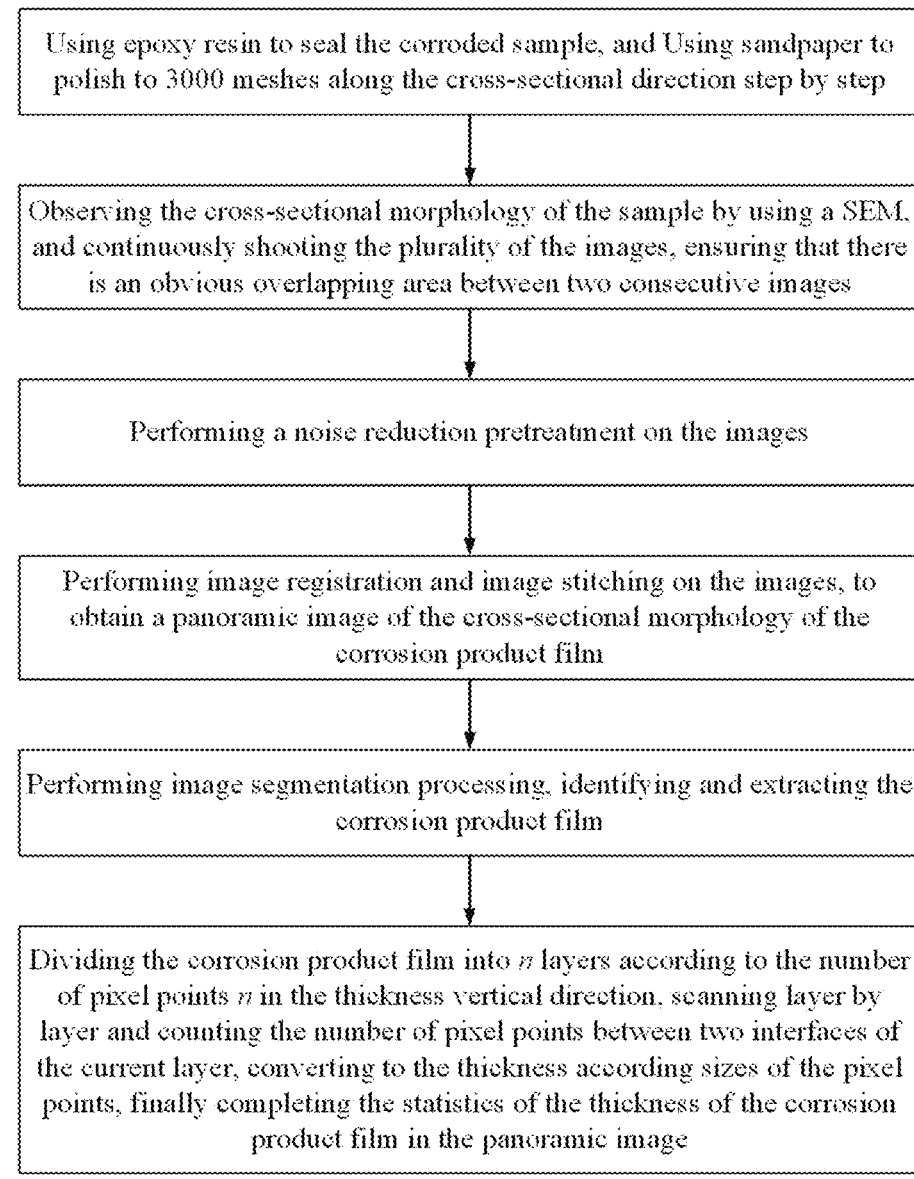
FIG. 1 is a flowchart of a method according to Embodiment 1 of the present invention.

The present invention will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

Embodiment 1

The corrosion product film formed by corrosion on the surface of pipeline steel of oil and natural gas pipeline will greatly affect the corrosion process. Therefore, it is necessary to study the thickness of the corrosion product film and deepen the understanding of corrosion behaviors. The traditional method for calculating the thickness of the corrosion product film is estimated according to a single image, mainly based on the observation of a local cross-sectional image captured by the SEM, and its representativeness and accuracy are low. Specifically, due to the uneven distribution of the corrosion product film on the pipeline surface, the film thickness also presents obvious uneven features. The method for the statistics of the thickness of the corrosion product film based on the single cross-sectional image captured by the SEM, only can obtain the thickness of a small range of corrosion product film, and has a low representativeness, cannot reflect the distribution features of the thickness of the corrosion product film.

In view of the above problems, the present embodiment provides a method for statistics of thickness of a corrosion product film based on image processing, comprising:

acquiring a plurality of images of a corrosion product film on a surface of a pipeline;

stitching the plurality of the images to obtain an overall image; specifically, dividing each of the plurality of the images into a plurality of grid cells, estimating a homography matrix for each of the plurality of the grid cells; removing error matching points, searching for an optimal homography matrix and calculating a global homography matrix; calculating weight matrices in moving linear transformation in blocks according to the calculated global homography matrix and mapping to obtain the stitched overall image;

segmenting the overall image to obtain a feature area of the corrosion product film; specifically, segmenting a gray histogram into two sets of target and background data through thresholds, and when a between-class variance of the two sets of the segmented data is the largest, obtaining an optimal segmentation threshold, and then segmenting the overall image according to the optimal segmentation threshold; and performing division of thickness layers on the feature area of the corrosion product film according to a number of pixel points in a vertical direction of thickness, counting the number of the pixel points of each of the thickness layers, and obtaining a thickness of each of the thickness layers according to the counted number of the pixel points.

Specifically, the statistics of the thickness is performed after obtaining the overall image which can represent the larger area of the corrosion product film on the surface of the pipeline by stitching the plurality of the images, can realize the visualization and quantitative statistics of the thickness of the corrosion product film in a large range with high resolution, can obtain the distribution features of the thickness of the corrosion product film in a large range, and can obtain the thickness of each of the thickness layers by calculating the number of the pixel points, so that the accuracy of the statistics of the thickness is further ensured.

In the present embodiment, the steps of the method for statistics of the thickness of the corrosion product film based on image processing, comprising:

S1: determining a statistical target, wherein the statistical target can be an oil pipeline or a natural gas pipeline, etc.; in some embodiments, in order to better realize the description of the method, a cross-sectional sample of the corrosion product film with good imaging effect can also be prepared to replace the actual pipeline as the statistical target.

Specifically, when the statistical target is the oil pipeline or the natural gas pipeline, a pipeline in use can be selected, and a waste pipeline can also be observed. When using the sample instead of the actual pipeline, optional, selecting a pipeline as the sample and carry out a conventional corrosion treatment on the sample, using epoxy resin to seal the corroded sample, and using sandpaper to polish to 3000 meshes along the cross-sectional direction step by step, so as to ensure that the surface of the polished sample is in the same plane.

Figure 2:
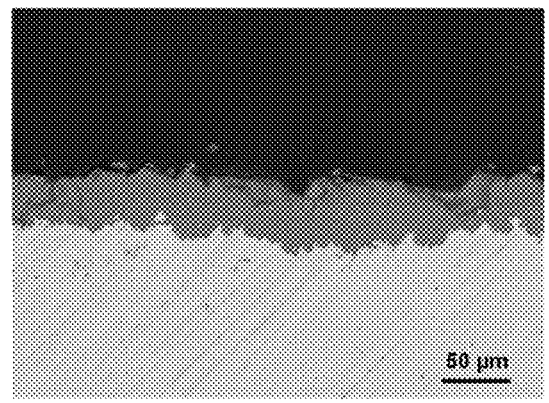
FIG. 2 is a cross-sectional topography image of a sample taken using a SEM according to Embodiment 1 of the present invention.

S2: as shown in FIG. 2, observing the cross-sectional morphology of the sample by using a SEM, and continuously shooting the plurality of the images by the SEM.

Specifically, in the shooting of the SEM, the magnification is determined based on the principle of being able to clearly distinguish details of the boundaries of the inner and outer surfaces of the corrosion product film, and in the determined magnification, the continuous image shooting is performed on the cross section of the sample along the direction of the surface of the substrate.

In order to ensure the accuracy of image stitching, ensure that there is an obvious overlapping area between a next image and a previous image during the shooting process, and an optional overlap value is 50%.

Figure 3:
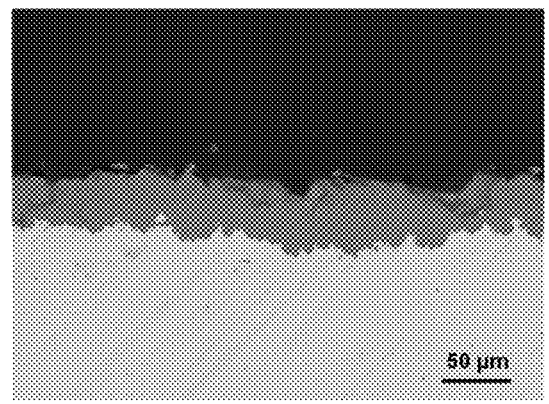
FIG. 3 is an image after noise reduction preprocessing according to Embodiment 1 of the present invention.

S3: as shown in FIG. 3, performing a noise reduction pretreatment on the images captured by the SEM to improve the image quality, so that the boundaries between the inner and outer surfaces of the corrosion product film can be clearly distinguished.

Optionally, in order to avoid interfering with a subsequent identification of the boundaries of the corrosion product film, the noise reduction pretreatment of the images captured by the SEM needs to be carried out on the premise of maintaining the edge and structure information, and a Non-Local Means (NLM) algorithm can be adopted. Compared with the traditional filtering algorithm, this algorithm uses image blocks for comparison instead of single pixel point, which can better retain the image structure and image edge information. A flow of the NLM algorithm is as follows:

S3.1: inputting an image A, calculate a Gaussian kernel $J_\alpha$ according to a similarity window:

$$J_\alpha(x, y) = \exp\left(-\frac{(y-d_s)^2 - (x-d_s)^2}{2\alpha^2}\right)$$

where, x and y represent the center pixel coordinates of the center pixel point of a current image block and an image block to be compared respectively; $d_s$ represent the half-window width of the similarity window; and $\alpha$ represent the Gaussian kernel standard deviation. Repeat the calculation of $J_\alpha(x, y)$ to obtain a cumulative value until all pixels are traversed, let sum=0, so that:

sum=sum+$J_\alpha(x, y)$

Normalizing the Gaussian Kernel:

$$J_\alpha = \frac{J_\alpha}{\text{sum}}$$

S3.2: calculating the Euclidean distance $D_{ist}$ between the neighborhood image blocks V(x) and V(y), initializing $D_{ist}$=0, so that:

$$D(x, y) = J_\alpha \Sigma\Sigma(V(x)-V(y))^2$$

$$D_{ist} = D_{ist} + D(x, y)$$

where, V(x) represents the image block with x as the center pixel point; V(y) represents the translated neighborhood image block, and the calculation process is performed cyclically. After traversing all the pixel points, the final weighted Euclidean distance d(x, y) of the center pixel point of the current image block is:

$$d(x, y) = \frac{D_{ist}}{L^2}$$

where, L represents the weighted Gaussian radius; $D_{ist}$ represents the Euclidean distance.

S3.3: calculating a weight function according to the final weighted Euclidean distance:

$$w(x, y) = \frac{1}{Z(x)} \exp\left(-\frac{d(x, y)}{h^2}\right)$$

where, $Z(x) = \sum \exp\left(\frac{-d(x, y)}{h^2}\right)$, h is the filter coefficient that controls the intensity of the entire filter and has the following linear relationship with the image noise standard deviation σ:

$$h = k_0 \cdot \sigma$$

where, $k_0$ is a constant.

S3.4: updating the value of the center pixel point of the current image block:

$$A(x) = \Sigma_{y \in I} w(x, y) \cdot A(y)$$

where, A(y) is the neighborhood image block; w is the weighted value.

S3.5: initializing the weighting value to zero, updating the superposition weighted value until all the images are traversed, and finally obtaining the weighted value at the center pixel point of the current image block is as follows:

$$w = w + w(x, y)$$

S3.6: performing a reconstruction to obtain an image A:

$$A_1 = \frac{\sum_{y \in I} w \cdot A(y)}{\sum_{y \in A} w}$$

In other embodiments, the noise reduction preprocessing may also be implemented by conventional techniques, and will not be described in detail herein.

Figure 4:
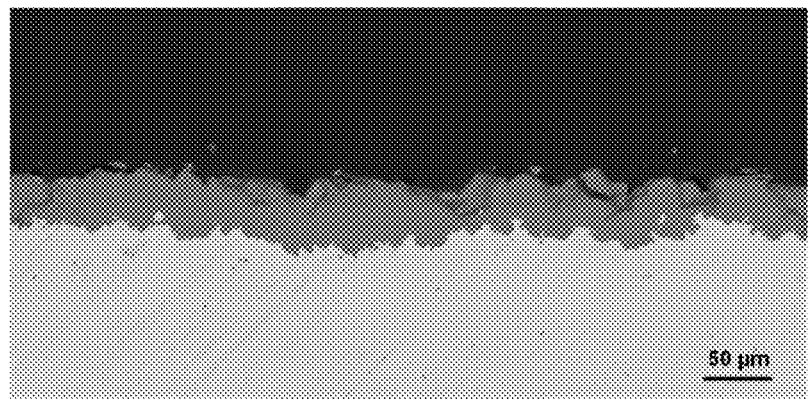
FIG. 4 is an image after registration and stitching according to Embodiment 1 of the present invention.

S4: as shown in FIG. 4, in order to comprehensively reflect the distribution of the thickness of the corrosion product film as much as possible, image registration and image stitching are performed on the images captured by the SEM to obtain a panoramic image of the cross-sectional morphology of the corrosion product film, and the observation range of the image of the corrosion product film is enlarged under the premise of high resolution, so that the visualization of the thickness of the corrosion product film in a large range and high resolution can be realized.

Optionally, the image registration comprises: obtaining feature points through feature extraction, and then performing feature matching through similarity measurement; the image stitching can adopt an As-Projective-As-Possible (APAP) method to accurately stitch multiple images to obtain the panoramic image of the cross-sectional morphology of the corrosion product film, which increases the observation range of the images of the corrosion product film.

Wherein, the APAP method is an efficient algorithm for image stitching based on morphing method, considering the deviation of interior lines caused by projection deformation. The APAP method divides multiple images into grid cells and estimates a homography matrix for each the grid cell. First, performing a scale-invariant feature transformation detection, to detect feature points on input images; then, removing error matching points through a random sample consistency algorithm, and searching an optimal homography matrix, for calculating a global homography matrix in the next step; and finally, calculating and mapping weight matrices in moving linear transformation in blocks, so that the stitched image is obtained.

S5: performing image segmentation processing on the stitched integral image to identify the corrosion product film.

Specifically, the image segmentation can adopt the Otsu's method to determine the segmentation threshold, and then binarization processing is performed on the image according to the segmentation threshold to segment the corrosion product film and background, and the segmented image well retains the details of the boundaries of the corrosion product film.

Wherein, the Otsu's method is used to segment the gray histogram into two sets of data: target $C_1$ and background $C_0$, when the inter class variance or intra class variance of the two segmented data sets is the largest or the smallest, the optimal segmentation threshold can be obtained. After the segmentation threshold is determined, the binarization processing is performed on the image so that the pixel value of the target $C_1$ is 1 and the pixel value of the background $C_0$ is 0.

Figure 5:
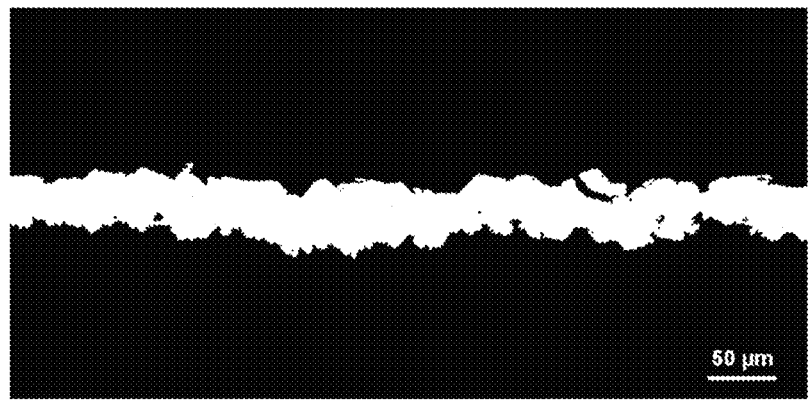
FIG. 5 is an image after segmentation according to Embodiment 1 of the present invention.

As shown in FIG. 5, the area of the corrosion product film in the segmented image, as a target, is well separated from the background, wherein, the corrosion product film is displayed in white and the background is displayed in black, providing an analysis region for subsequent quantitative statistics of the thickness of the corrosion product film.

Figure 6:
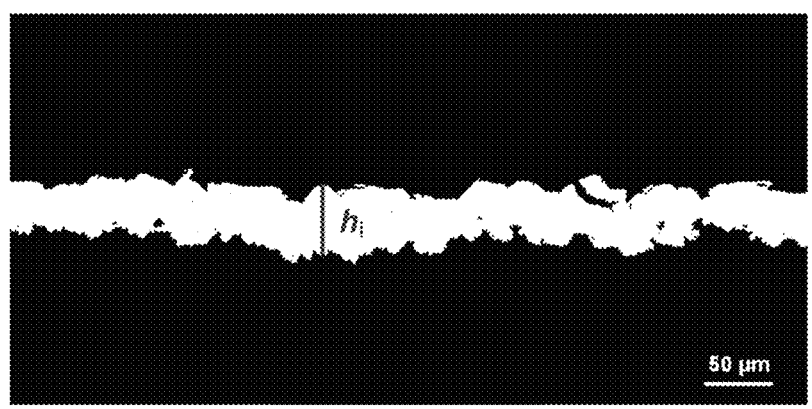
FIG. 6 is a diagram of statistics of thickness of Embodiment 1 of the present invention.

S6: as shown in FIG. 6, dividing thickness layers of the corrosion product film according to the pixel points, counting the number of pixel points layer by layer and converting them into thickness; specifically, the statistics of the thickness of the corrosion product film comprises:

S6.1: dividing the corrosion product film into n layers according to the number of pixel points n in the thickness vertical direction;

S6.2: scanning layer by layer and counting the number of pixel points between two interfaces of each of the thickness layers, multiply the number of the pixel points by the size of the pixel points, and convert to thickness;

Specifically, pixel values of the pixel points are retrieved one by one along the thickness direction in a certain layer i. When the pixel value is changed from 0 to 1, it indicates that the background is changed into the corrosion product film, which is the first boundary of the corrosion product film of this layer, and the position of this point is recorded as $j_1$; keeping retrieving, when the pixel value is changed from 1 to 0 again, it indicates that the corrosion product film is changed into the background, which is the second boundary of the corrosion product film of this layer, and the position of this point is recorded as $j_2$; the thickness $h_i$ of the $i^{th}$ layer of the corrosion product film is:

$$h_i = N|j_2 - j_1|$$

where, N is the pixel size.

S6.3: completing the statistics of the thickness of the corrosion product film in the panoramic image, as shown in FIG. 6, wherein $h_i$ is the thickness of the corrosion product film at a certain position obtained statistically.

Specifically, the thickness of each of the layers is summarized, and then frequency statistics are performed to obtain a thickness distribution histogram.

According to the method of the present embodiment, the cross-sectional images of the corrosion product film in a larger space range with high-resolution can be obtained, meanwhile, the statistics of the thickness of the film can be realized, the observation range of the images of the corrosion product film is enlarged, automatic quantitative statistics of the thickness of the corrosion product film is realized, and the statistics of the thickness of the corrosion product film is more accurate and efficient.

Embodiment 2

The present embodiment provides a system for statistics of thickness of a corrosion product film based on image processing, comprising:

a data acquisition module, being configured to acquire a plurality of images of a corrosion product film on a surface of a pipeline;

an image stitching module, being configured to stitch the plurality of the images to obtain an overall image; specifically, dividing each of the plurality of the images into a plurality of grid cells, estimating a homography matrix for each of the plurality of the grid cells; removing error matching points, searching for an optimal homography matrix and calculating a global homography matrix; calculating weight matrices in moving linear transformation in blocks according to the calculated global homography matrix and mapping to obtain the stitched overall image;

a feature segmentation module, being configured to segment the overall image to obtain a feature area of the corrosion product film; specifically, segmenting a gray histogram into two sets of target and background data through thresholds, and when a between-class variance of the two sets of the segmented data is the largest, obtaining an optimal segmentation threshold, and then segmenting the overall image according to the optimal segmentation threshold; and a thickness statistics module, being configured to perform division of thickness layers on the feature area of the corrosion product film according to a number of pixel points in a vertical direction of thickness, count the number of the pixel points of each of the thickness layers, and obtain a thickness of each of the thickness layers according to the counted number of the pixel points.

The working method of the system is the same as that of the method for statistics of the thickness of the corrosion product film based on image processing in Embodiment 1, and is not described here.

Embodiment 3

The present embodiment provides a non-transitory computer readable storage medium having a computer program stored thereon, when the computer program is executed by a processor, implementing the steps of the method for statistics of the thickness of the corrosion product film based on image processing described in Embodiment 1.

Embodiment 4

The present embodiment provides an electronic apparatus, comprising a memory, a processor, and a computer program stored on the memory and executable on the processor, when the program is executed by the processor, implementing the steps of the method for statistics of the thickness of the corrosion product film based on image processing described in Embodiment 1.

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. A method for statistics of thickness of a corrosion product film based on image processing, comprising:

acquiring a plurality of images of a corrosion product film on a surface of a pipeline;

stitching the plurality of the images to obtain an overall image, specifically by: dividing each of the plurality of the images into a plurality of grid cells, estimating a homography matrix for each of the plurality of the grid cells; removing error matching points and calculating a global homography matrix according to the estimated homography matrices; calculating weight matrices in moving linear transformation in blocks according to the calculated global homography matrix and mapping to obtain the stitched overall image;

segmenting the overall image to obtain a feature area of the corrosion product film, specifically by: segmenting a gray histogram into two sets of data: target data and background data, by using thresholds, taking one of the thresholds that maximizes an inter class variance between the segmented target data and background data as an optimal segmentation threshold, and then segmenting the overall image by using the optimal segmentation threshold; and performing division of thickness layers on the feature area of the corrosion product film according to a number of pixel points in a vertical direction of thickness, counting the number of the pixel points of each of the thickness layers, and obtaining a thickness of each of the thickness layers according to the counted number of the pixel points, specifically comprising:

performing the division of the thickness layers of the corrosion product film according to the pixel points, counting the number of the pixel points layer by layer and converting into thickness; specifically, the statistics of the thickness of the corrosion product film, comprising:

dividing the corrosion product film into n layers according to the number of pixel points n in the thickness vertical direction;

scanning layer by layer and counting the number of pixel points between two interfaces of each of the thickness layers, multiply the number of the pixel points by the size of the pixel points, and convert to thickness; wherein, specifically, pixel values of the pixel points are retrieved one by one along the thickness direction in a certain layer i; when the pixel value is changed from 0 to 1, it indicates that the background is changed into the corrosion product film, which is the first boundary of the corrosion product film of this layer, and the position of this point is recorded as $j_1$; keeping retrieving, when the pixel value is changed from 1 to 0 again, it indicates that the corrosion product film is changed into the background, which is the second boundary of the corrosion product film of this layer, and the position of this point is recorded as $j_2$; the thickness $h_i$ of the $i^{th}$ layer of the corrosion product film is:

$$h_i = N|j_2 - j_1|$$

where, N is the pixel size; and completing the statistics of the thickness of the corrosion product film in the panoramic image, wherein $h_i$ is the thickness of the corrosion product film at a certain position obtained statistically.

2. The method for the statistics of the thickness of the corrosion product film based on image processing according to claim 1, further comprising: obtaining a plurality of cross-sectional images of the corrosion product film on the surface of the pipeline by continuously shooting through a SEM; determining a magnification according to a principle of clearly distinguishing boundary lines between an inner surface and an outer surface of the corrosion product film during the shooting; and, performing the continuous shooting of pipeline cross-sections along a surface direction of a substrate of the pipeline under the determined magnification.

3. The method for the statistics of the thickness of the corrosion product film based on image processing according to claim 1, wherein in the plurality of the images, all two consecutive images have an overlapping area.

4. The method for the statistics of the thickness of the corrosion product film based on image processing according to claim 1, further comprising: performing a noise reduction processing on the plurality of the images; specifically, calculating and normalizing a Gaussian kernel according to a similarity window; calculating Euclidean distances between neighboring image blocks according to the normalized Gaussian kernel, and traversing all the pixel points to obtain a final weighted Euclidean distance of a center pixel point of a current image block; calculating a weight function according to the final weighted Euclidean distance; updating a value of the center pixel point of the current image block; initializing a weighted value to zero, updating a superposition weighted value until the plurality of the images are traversed, to finally obtain the weighted value at the center pixel point of the current image block; and, obtaining the overall image by performing reconstruction according to weighted values at center pixel points.

5. The method for the statistics of the thickness of the corrosion product film based on image processing according to claim 1, further comprising extracting feature points of the plurality of the images, and performing a feature matching by similarity measurement; and stitching the plurality of the images to obtain a panoramic image of a cross-sectional morphology of the corrosion product film.

6. The method for the statistics of the thickness of the corrosion product film based on image processing according to claim 1, further comprising segmenting the corrosion product film and the background according to different gray values in the stitched overall image.

7. A non-transitory computer readable storage medium having a computer program stored thereon, when the computer program is executed by a processor, implementing the steps of the method for statistics of the thickness of the corrosion product film based on image processing according to claim 1.

8. An electronic apparatus, comprising a memory, a processor, and a computer program stored on the memory and executable on the processor, when the program is executed by the processor, implementing the steps of the method for statistics of the thickness of the corrosion product film based on image processing according to claim 1.

* * * * *